(12) United States Patent
Gattami

(10) Patent No.: US 10,243,632 B2
(45) Date of Patent: Mar. 26, 2019

(54) MULTI-STREAM FASTER-THAN-NYQUIST TRANSMISSION USING BANDWIDTH PARTITIONING

(71) Applicant: Telefonaktiebolaget LM Ericsson (publ), Stockholm (SE)

(72) Inventor: Ather Gattami, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/565,687

(22) PCT Filed: Apr. 15, 2015

(86) PCT No.: PCT/EP2015/058197
§ 371 (c)(1),
(2) Date: Oct. 11, 2017

(87) PCT Pub. No.: WO2016/165761
PCT Pub. Date: Oct. 20, 2016

(65) Prior Publication Data
US 2018/0076861 A1   Mar. 15, 2018

(51) Int. Cl.
*H04L 1/02* (2006.01)
*H04B 7/0456* (2017.01)
(Continued)

(52) U.S. Cl.
CPC ......... *H04B 7/0456* (2013.01); *H04B 7/0413* (2013.01); *H04B 7/0417* (2013.01); *H04B 7/0465* (2013.01); *H04B 7/0473* (2013.01); *H04B 7/0615* (2013.01); *H04B 7/0617* (2013.01); *H04L 1/0026* (2013.01); *H04L 25/0246* (2013.01); *H04L 25/0384* (2013.01); *H04L 25/03343* (2013.01);
(Continued)

(58) Field of Classification Search
CPC ....... H04L 1/0618; H04L 1/06; H04L 5/0044; H04L 1/0042; H04B 7/0617
USPC ........ 375/267, 260, 230, 340, 341; 370/210, 370/343
See application file for complete search history.

(56) References Cited

U.S. PATENT DOCUMENTS 9,219,632 B2 * 12/2015 Eliaz .................... H04L 1/0042
2017/0078061 A1 * 3/2017 Sawahashi ............ H04L 5/0044

OTHER PUBLICATIONS

Precoded Spectrally Efficient FDM System by Safa Isam and Izzat Darwazeh; 2010 IEEE 21st International Symposium on Personal Indoor and Mobile Radio Communications—2010.
(Continued)

*Primary Examiner* — Khai Tran
(74) *Attorney, Agent, or Firm* — Patent Portfolio Builders, PLLC

(57) ABSTRACT

The present disclosure generally relates to the field of Faster-Than-Nyquist Signaling More specifically, the present disclosure relates to a technique of supporting Faster-Than-Nyquist transmission of data in a Multiple Input Multiple Output environment. A method embodiment comprises: forming two or more spatial data streams from data to be transmitted in the MIMO environment; partitioning a frequency band available for transmission of the data in the MIMO environment over the two or more spatial data streams into two or more sub-bands; and processing each of the two or more spatial data streams using FTN sampling.

9 Claims, 8 Drawing Sheets

(51) Int. Cl.
    H04L 25/03      (2006.01)
    H04B 7/0413     (2017.01)
    H04B 7/0417     (2017.01)
    H04B 7/06       (2006.01)
    H04L 1/00       (2006.01)
    H04L 25/02      (2006.01)
    H04L 25/497     (2006.01)
(52) U.S. Cl.
    CPC ...... *H04L 25/03891* (2013.01); *H04L 25/497* (2013.01); *H04L 2025/03426* (2013.01)

(56) References Cited

OTHER PUBLICATIONS

Low Complexity Algorithms for Faster-Than-Nyquist Signaling; Using Coding to Avoid an NP-Hard Problem by Emil Ringh; Master of Science Thesis; Stockholm, Sweden—2013.
VLSI Architecture for a Reconfigurable Spectrally Efficient FDM Baseband Transmitter by Paul N. Whatmough et al.; IEEE Transactions on Circuits and Systems—I: Regular Papers, vol. 59, No. 5—May 2012.
PCT International Search Report for International application No. PCT/EP2015/058197—dated Dec. 18, 2015.
PCT Written Opinion of the International Searching Authority for International application No. PCT/EP2015/058197 —dated Dec. 18, 2015.

* cited by examiner

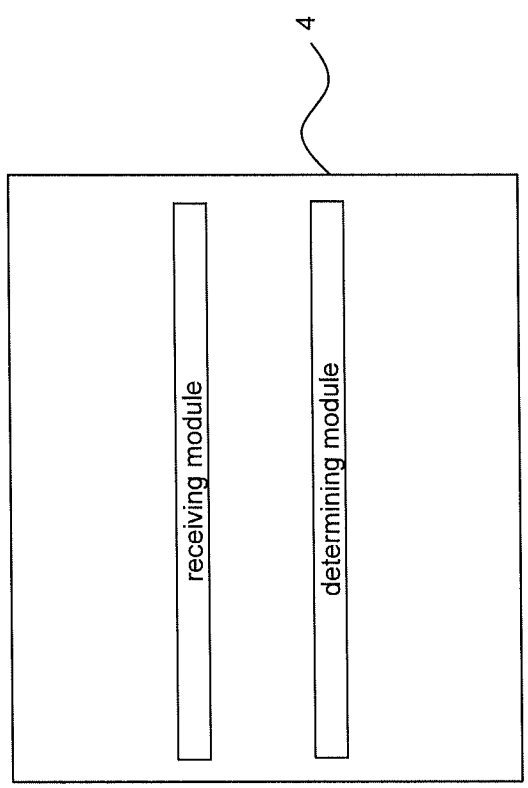

US 10,243,632 B2

MULTI-STREAM FASTER-THAN-NYQUIST TRANSMISSION USING BANDWIDTH PARTITIONING

PRIORITY

This nonprovisional application is a U.S. National Stage Filing under 35 U.S.C. § 371 of International Patent Application Serial No. PCT/EP2015/058197 filed Apr. 15, 2015, and entitled "Multi-Stream Faster-Than-Nyquist Transmission Using Bandwidth Partitioning."

TECHNICAL FIELD

The present disclosure generally relates to the field of Faster-Than-Nyquist Signaling. More specifically, the present disclosure relates to a technique of supporting Faster-Than-Nyquist transmission of data in a Multiple Input Multiple Output environment.

BACKGROUND

Multiple Input Multiple Output (MIMO) is a method for multiplying the capacity of a radio link using multiple transmit and receive antennas to exploit multipath propagation. MIMO has become an essential element of wireless communication standards including IEEE 802.11n, IEEE 802.11ac and Long Term Evolution (LTE). In modern usage, "MIMO" specifically refers to a practical technique for sending and receiving more than one data signal on the same radio channel at the same time via multipath propagation. MIMO can be sub-divided into three main categories, precoding, spatial multiplexing, and diversity coding.

In MIMO systems (sometimes also referred to as multi-antenna systems), a transmitter sends multiple streams by multiple transmit antennas. The transmit streams go through a channel having $N_t * N_r$ paths between the $N_t$ transmit antennas at the transmitter and $N_r$ receive antennas at the receiver. Because of the $N_t * N_r$ paths between the $N_t$ transmit antennas and the $N_r$ receive antennas such a channel may also be referred to as matrix channel. The receiver obtains the received signal (e.g., received signal vectors) by the multiple receive antennas and decodes the received signal (e.g., received signal vectors) into the original information from the transmitter side.

In MIMO systems it is desirable to use spatial diversity to increase the reliability of data transmission. However, often there is inter-symbol-interference due to the multiple streams. A system model that describes the input-output behavior of a MIMO system is given by $$r = H\bar{s} + v$$

where H is the channel matrix of a frequency flat channel/narrowband flat fading channel between the transmitter and the receiver. The channel matrix H is assumed to be known at both the transmitter and receiver, i.e., perfect Channel State Information (CSI) is assumed. Further, v is the noise term (noise vector), $\bar{s}$ is the transmitted signal (transmit vector), and r is the received signal (receive vector). Frequency flatness is common for well-localized pulses in frequency. Frequency flatness may be replaced with the channel estimate and the error may be included in the noise term v (noise vector). One approach for transmitting over MIMO channels is to use Singular Value Decomposition (SVD). In SVD the signal $\bar{s}$ is a pre-coded version of the original signal s through multiplication by a unitary matrix V and a scaling matrix D which is diagonal:

$$\bar{s} = V \cdot D \cdot s$$

A problem with the pre-coding approach above is that the pre-coded signal $\bar{s}$ does not have the same spectrum as the original signal s, which often leads to additional spectral leakage causing interference in the system.

SUMMARY

There is a need for an improved technique for data transmission in a MIMO environment.

According to a first aspect, a method of supporting Faster-Than-Nyquist (FTN) transmission of data in a Multiple Input Multiple Output (MIMO) environment is provided. The method comprises forming two or more spatial data streams from data to be transmitted in the MIMO environment. The method further comprises partitioning a frequency band available for transmission of the data in the MIMO environment over the two or more spatial data streams into two or more sub-bands. The method further comprises processing each of the two or more spatial data streams using FTN sampling.

The method according to the first aspect may be carried out in and/or by a transmitter of the MIMO environment.

The term "spatial streams" may be understood to define different spaces via which signals can be transmitted. For example, the signals may be transmitted by two or more transmit antennas of a MIMO system to two or more receive antennas of the MIMO system, thereby defining multiple spatial streams between the transmit and receive antennas. A spatial stream may be regarded as a link in the MIMO environment. The terms "spatial data streams" and "spatial signal streams" may be understood to relate to data or signals, respectively, that are formed from the data to be transmitted and that can be transmitted via the aforementioned spatial streams. In short, a spatial stream may be regarded as a link that carries a signal (a spatial signal stream), which in turn carries data (a spatial data stream, or, in short, data stream).

By the partitioning, the frequency band may be divided into two or more sub-bands. In this respect, the term "partitioning a frequency band available for transmission of the data in the MIMO environment over the two or more spatial data streams into two or more sub-bands" may be understood such that the frequency band is divided into two or more sub-bands and the two or more spatial data streams are allocated to the two or more sub-bands or vice versa.

In a first variant, the two or more sub-bands may have an equal bandwidth, respectively. In a second variant, the two or more sub-bands may have a different bandwidth, respectively. In a third variant, at least two of the two or more sub-bands may have an equal bandwidth, respectively, and at least two of the two or more sub-bands may have a different bandwidth, respectively.

The method may comprise allocating one of the two or more sub-bands to each of the two or more spatial data streams or, vice versa, allocating one of the two or more spatial data streams to each of the two or more sub-bands. In certain embodiments, the number of the two or more spatial data streams may correspond to the number of the two or more sub-bands. In the latter case, exactly one of the two or more spatial data streams may be allocated to each of the two or more sub-bands. For example, at first, the two or more spatial data streams may be formed from the data to be transmitted and then a respective number of sub-bands may be formed by partitioning of the frequency band.

In certain embodiments, the method may comprise precoding (sometimes also written pre-coding) the two or more spatial data streams based on information about properties of the MIMO channel of the MIMO environment. The properties of the MIMO channel may be or comprise channel state information (CSI). The CSI may be provided by the receiver to the transmitter. In wireless communications, CSI may be understood to refer to known channel properties of a communication link. In the specific case of a MIMO environment, the CSI may be understood to refer to known properties of the MIMO channel. This information may describe how a signal propagates from the transmitter to the receiver. The CSI may make it possible to adapt transmissions to current channel conditions. This facilitates achieving reliable communication with high data rates in multi-antenna systems. The CSI may be estimated at the receiver and may be fed back to the transmitter. Alternatively, reverse-link estimation may be possible in TDD systems, for example.

The step of precoding may comprise applying a singular value decomposition (SVD) technique to the information about properties of the MIMO channel. For example, the SVD may be applied to the CSI.

The information about properties of the MIMO channel may comprises a channel matrix H of the MIMO channel. Further, the step of applying a SVD technique may comprise determining a factorization of the form $H=U\Sigma V^*$, where U is an m×m real or complex unitary matrix, $\Sigma$ is an m×n rectangular diagonal matrix containing singular values of the channel matrix as non-negative real numbers on the diagonal, and $V^*$ is an n×n real or complex unitary matrix.

The step of precoding may comprise applying a chosen diagonal scaling matrix to the two or more spatial data streams. The chosen diagonal scaling matrix may allocate different gains to the two or more spatial data streams.

The method may further comprise repeatedly determining information about properties of the MIMO channel of the MIMO environment. For example, the CSI may be repeatedly determined. Further, the CSI may be repeatedly reported, e.g. from a receiver to a transmitter of a MIMO system.

The method may comprise transmitting each of the two or more spatial data streams. For example, the method may comprise transmitting each of the two or more spatial data streams via two or more spatial streams from two or more transmit antennas of the MIMO environment. The two or more spatial data streams may be received by two or more receive antennas of the MIMO environment.

According to a second aspect, a method of supporting reception of data transmitted Faster-Than-Nyquist (FTN) in a Multiple Input Multiple Output (MIMO) environment is provided. The method comprises receiving two or more spatial data streams that are processed using FTN sampling. The spatial data streams are formed from data to be transmitted in the MIMO environment. A frequency band available for transmission of the data in the MIMO environment is partitioned over the two or more spatial data streams in two or more sub-bands. The method further comprises determining a received signal from the two or more received spatial data streams.

The method according to the second aspect may be carried out in and/or by a receiver of the MIMO environment.

The received signal y may be determined using the following formula $y=H\bar{s}+v$, where H is the channel matrix of the MIMO channel of the MIMO environment, $\bar{s}$ is a precoded vector of the two or more spatial data streams, and v is the noise over the MIMO channel.

The method may comprise determining the transmitted data from the received signal. The transmitted data may be determined by using the following equation $y=Ga+G^{1/2}w$, where G is a matrix determined from FTN pulses for sampling the transmitted data, a is the transmitted data and w is Gaussian noise.

According to a third aspect, a method of Faster-Than-Nyquist (FTN) transmission of data in a Multiple Input Multiple Output (MIMO) environment is provided. The method comprises forming two or more spatial data streams from data to be transmitted in the MIMO environment. The method further comprises partitioning a frequency band available for transmission of the data in the MIMO environment over the two or more spatial data streams into two or more sub-bands. The method further comprises processing each of the two or more spatial data streams using FTN sampling. The method further comprises transmitting each of the two or more spatial data streams. The method further comprises receiving the two or more spatial data streams. The method further comprises determining a received signal from the two or more received spatial data streams.

The method according to the third aspect may be carried out in and/or between a transmitter and a receiver of the MIMO environment.

According to a fourth aspect, a computer program is provided. The computer program comprises program code portions for causing the steps of any one of the method aspects described herein to be performed, when the computer program is run on a computer system or on one or more computing devices, e.g. an apparatus, a base station, or another entity or component as disclosed herein. The computer program may be stored on a computer-readable recording medium or may be downloadable as a signal.

According to a fifth aspect, an apparatus for supporting Faster-Than-Nyquist (FTN) transmission of data in a Multiple Input Multiple Output (MIMO) environment is provided. The apparatus comprises a forming component, a partitioning component and a processing component. The forming component is configured to form two or more spatial data streams from data to be transmitted in the MIMO environment. The partitioning component is configured to partition a frequency band available for transmission of the data in the MIMO environment over the two or more spatial data streams into two or more sub-bands. The processing component is configured to process each of the two or more spatial data streams using FTN sampling.

The apparatus according to the fifth aspect may be configured to perform any of the method steps of the method according to the first aspect described herein.

The apparatus according to the fifth aspect may be configured as or may be part of a transmitter of the MIMO environment. The apparatus according to the fifth aspect may be configured as or may be part of a base station. The base station may comprise the apparatus according to the fifth aspect. The base station may comprise or may be configured as a Base Transceiver Station (BTS) in terms of Global System for Mobile Communication (GSM), a NodeB in terms of Universal Mobile Telecommunications System (UMTS), an eNodeB in terms of Long Term Evolution (LTE) or LTE-Advanced (LTE-A) or the like. In this respect, the MIMO environment/MIMO system may comprise a plurality of base stations such as a plurality of eNodeBs.

According to a sixth aspect, an apparatus for supporting reception of data transmitted Faster-Than-Nyquist (FTN) in a Multiple Input Multiple Output (MIMO) environment is provided. The apparatus comprises a receiving component and a determining component. The receiving component is configured to receive two or more spatial data streams that are processed using FTN sampling. The spatial data streams are formed from data to be transmitted in the MIMO environment. A frequency band available for transmission of the data in the MIMO environment is partitioned over the two or more spatial data streams in two or more sub-bands The determining component is configured to determine a received signal from the two or more received spatial data streams.

The apparatus according to the sixth aspect may be configured to perform any of the method steps of the method according to the second aspect described herein.

The apparatus according to the sixth aspect may be configured as or may be part of a receiver of the MIMO environment.

According to a seventh aspect, a system for Faster-Than-Nyquist (FTN) transmission of data in a Multiple Input Multiple Output (MIMO) environment is provided. The system comprises the apparatus according to the fifth aspect and the apparatus according to the sixth aspect.

The apparatus according to the seventh aspect may be configured to perform any of the method steps of the method according to the third aspect described herein.

In general, the steps of any one of the method aspects described herein may equally be embodied in one or more suitable components, devices or units, e.g. in suitable components of the apparatus according to the fifth aspect, the apparatus according to the sixth aspect and/or the system.

BRIEF DESCRIPTION OF THE DRAWINGS

In the following, the present disclosure will further be described with reference to exemplary embodiments illustrated in the figures, in which:

FIG. 4a is a flowchart illustrating a method embodiment performed in the device embodiment of FIG. 1a;

FIG. 6 is a block diagram schematically illustrating another device embodiment for implementing the device embodiment of FIG. 1a;

FIG. 7 is a block diagram schematically illustrating another device embodiment for implementing the device embodiment of FIG. 1a; and FIG. 8 is a block diagram schematically illustrating another device embodiment for implementing the device embodiment of FIG. 1b.

DETAILED DESCRIPTION

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, even if the present disclosure is described with reference to LTE as a specific example for a wireless communication network, the present disclosure may be practiced in any network to which mobile or stationary users may attach. For example, the present disclosure is applicable to other cellular networks such as Global System for Mobile Communications (GSM), Universal Mobile Telecommunications System (UMTS), LTE-Advanced (LTE-A) networks, or to Wireless Local Area Network (WLAN) or similar wireless networks. Further, even if in the below it is only referred to specific partitioning and precoding schemes, the general concepts described below may equally be applicable to other precoding and partitioning schemes.

Those skilled in the art will further appreciate that functions explained herein below may be implemented using individual hardware circuitry, using software functioning in conjunction with one or more processors, e.g. a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor arrangement and a memory arrangement coupled to a processor arrangement, wherein the memory arrangement is encoded with or stores one or more programs or corresponding code to cause the processor arrangement to perform or control the methods disclosed herein when executed by the processor arrangement.

Figure 1:
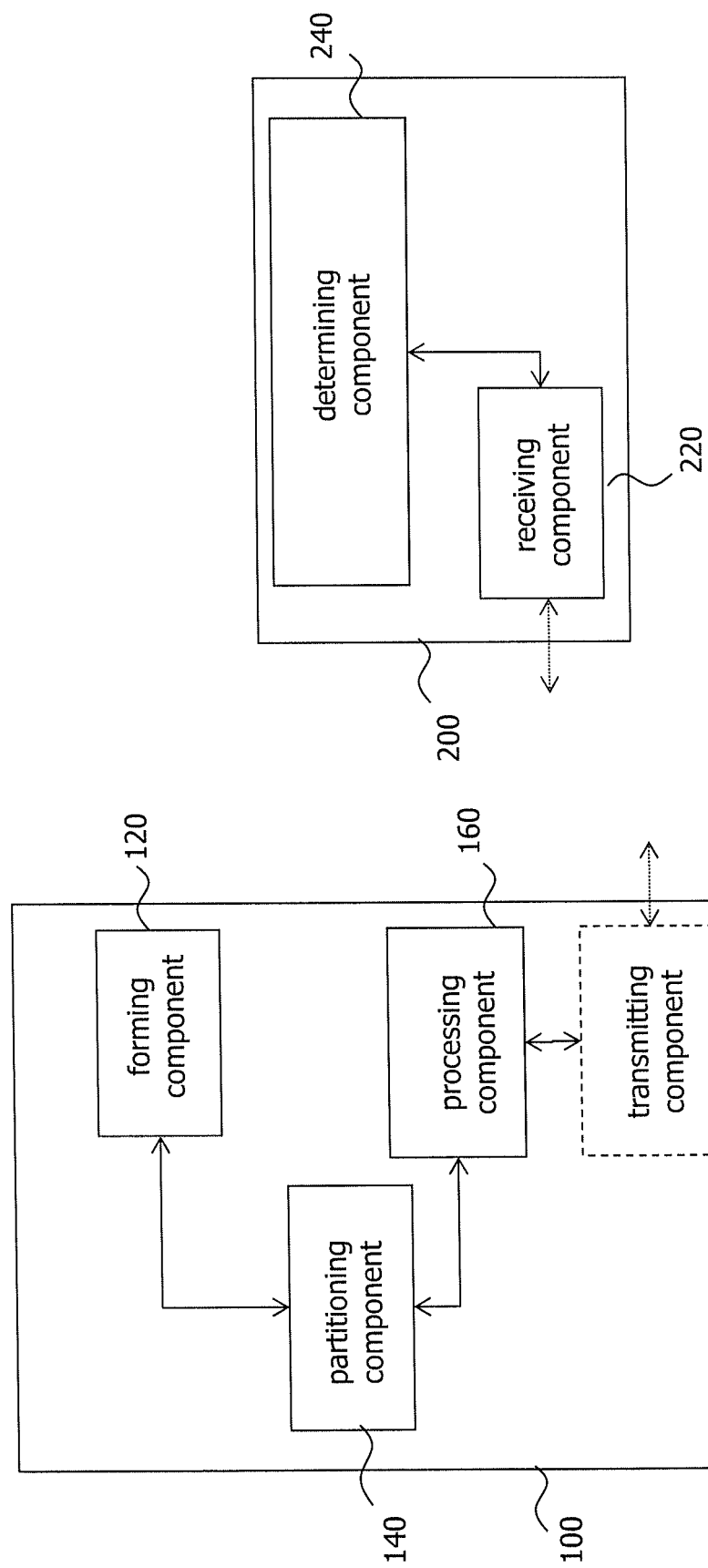
FIG. 1a is a schematic illustration of a device embodiment.
FIG. 1b is a schematic illustration of a device embodiment.

FIG. 1a shows an embodiment of an apparatus 100 for supporting Faster-Than-Nyquist (FTN) transmission of data in a Multiple Input Multiple Output (MIMO) environment. The apparatus 100 comprises a forming component 120, a partitioning component 140 and a processing component 160. Although the forming component 120, the partitioning component 140 and the processing component 160 are shown in FIG. 1a, by way of example, as separate components, they may equally embodied together as one or more components adapted to perform the forming and/or the partitioning and/or the processing as explained in more detail herein. The apparatus 100 may be part of or embodied in a transmitter of a wireless MIMO communication network. Such a wireless MIMO communication network may be configured as a wireless MIMO communication network conforming to the LTE standard. Further, the apparatus 100 may comprise an optional transmitting component 170.

FIG. 1b shows an embodiment of an apparatus 200 for supporting reception of data transmitted Faster-Than-Nyquist (FTN) in a Multiple Input Multiple Output (MIMO) environment. The apparatus 200 comprises a receiving component 220 and a determining component 240. Although the receiving component 220 and the determining component 240 are shown in FIG. 1b, by way of example, as separate components, they may equally embodied together as a component that is adapted to perform the receiving and the determining as explained in more detail herein. The apparatus 200 may be part of or embodied in a receiver of a wireless MIMO communication network. Such a wireless MIMO communication network may be configured as a wireless MIMO communication network conforming to the LTE standard.

Figure 2:
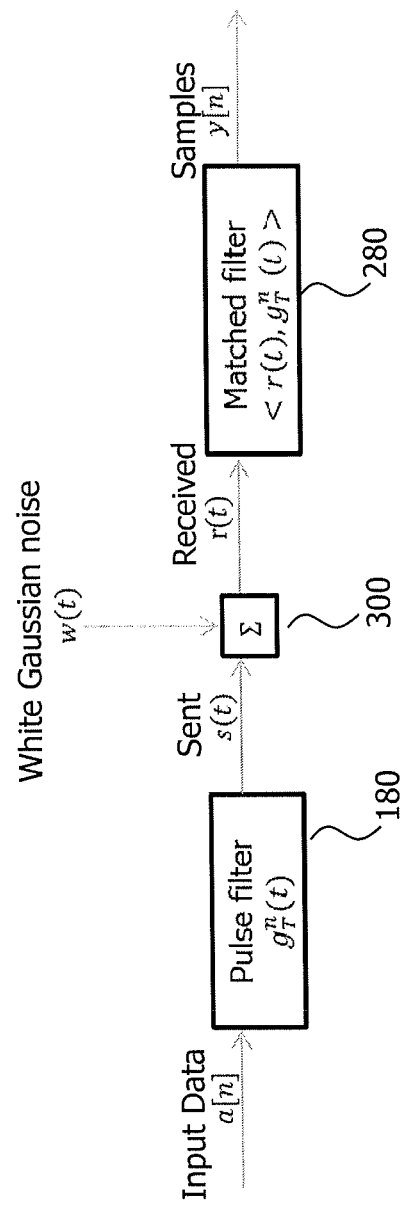
FIG. 2 is a schematic illustration of an Additive White Gaussian Noise channel.
Figure 3:
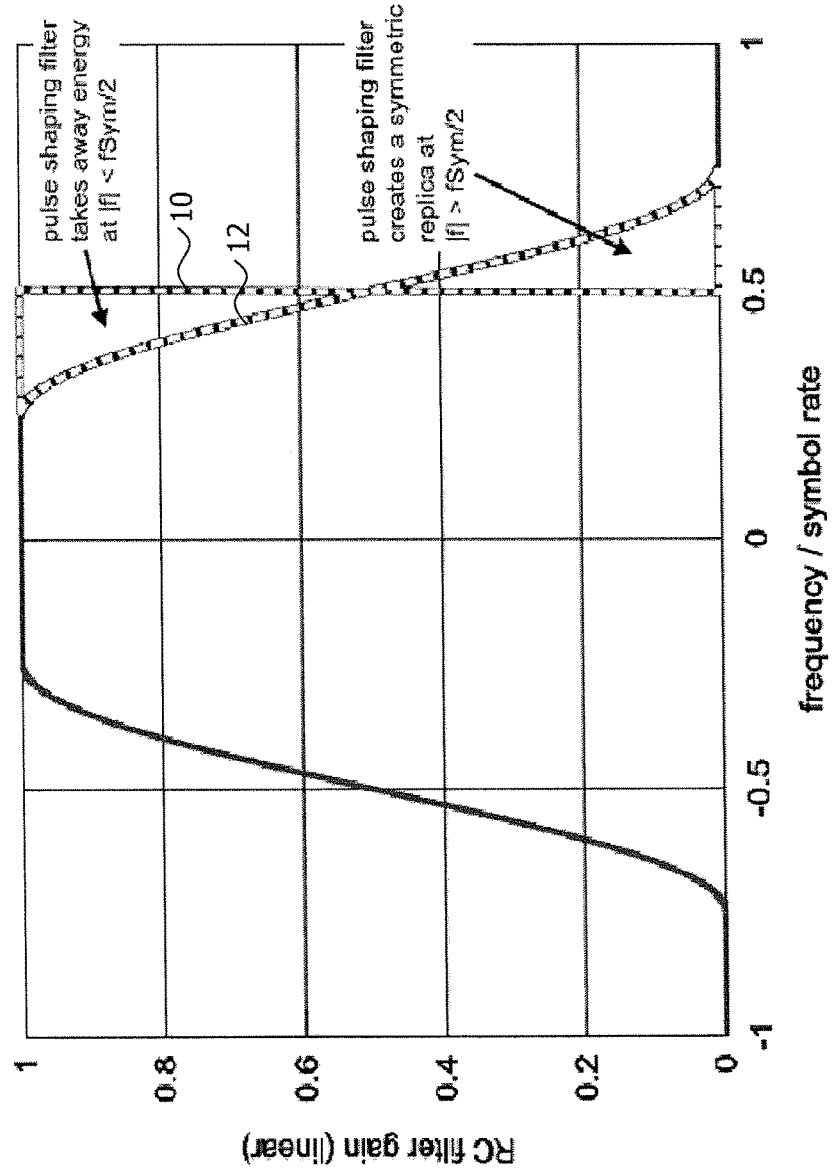
FIG. 3 is a schematic illustration of a spectrum of a pulse shape filter used in FIG. 2.

FIG. 2 shows, by way of example, a block diagram of a system for data transmission over an Additive White Gaussian Noise (AWGN) channel of a wireless communication network such as a wireless MIMO communication network. Transmitting over an AWGN-channel gives the received signal r(t) as follows:

$$r(t)=s(t)+w(t)$$

where w(t) is a stationary, white, Gaussian process and s(t) is the actually sent data derived from the input data a(n) by filtering the input data a(n) by means of a pulse filter (sometimes also referred to as pulse shaping filters). Wireless communications systems often make use of a pulse shaping filter. Such filters can reduce spectral leakage and reduce the impact of inter-symbol interference. However, in practice such ideal filters are non-realizable as the impulse response stretches from minus infinity to plus infinity. In other words, pulse filters 180 such as the one shown in FIG. 2 typically have a spectral leakage. Such a spectral leakage is, by way of example, shown in FIG. 3 with respect to the widely used root-raised-cosine filter spectrum 12. As can be seen from FIG. 3, the area around 0.5 of the spectrum 12 of the root-raised-cosine filter is not ideal as compared to an ideal filter spectrum 10. Compared to such an ideal filter spectrum 10 there is a lost spectral usage compared to the area between the frequencies −0.5 and 0.5 in case of an ideal filter. This loss is about 25%. In order to recover this loss, Faster-than-Nyquist (FTN) signaling can be used. FTN is defined over a single carrier system. FTN is a technique to apply Nyquist pulses (with sampling rate T), but instead of sending them time-separated by T seconds, one instead sends them separated by ρT seconds, were 0<ρ<1. Thus the transmitted signal becomes:

$$s(t) = \sum_k a[k] \cdot \sqrt{\rho}\, g_T(t - k\rho T)$$

where $\sqrt{\rho}\, g_T(t-n\rho T)$ is the new pulse shape of the pulse filter 180, normalized not to increase the power in the sender end (the matched filter 280 on the receiver side is corrected accordingly). For example, FTN can be used to compensate for the above-mentioned loss of the spectrum 12 of the root-raised-cosine filter by setting, by way of example, the FTN rate to ρ=0.8. The compensation by means of FTN may be explained as follows: In multi-rate digital signal processing the sampling rate of a signal can be changed in order to increase the efficiency of various signal processing operations. According to the Nyquist theorem, given a signal that is bandlimited to frequency f, this signal must be sampled at a rate equal to 2f in order for the signal to be perfectly reconstructed. When the sampling frequency is higher than the Nyquist frequency there is no overlap between signal replicas and the original spectrum and therefore no aliasing. In addition, multi-rate signal processing allows for an increase in the data rate. When the signal is sampled at a rate that is faster than Nyquist more bits, e.g., up to twice the bits, as ordinary modulation can be sent using the same energy and spectrum. As stated above, up to 25% spectral usage loss may occur through the use of non-ideal pulse filters which take energy away from the signal bandwidth. It is desirable to compensate for this loss in modern wireless communication systems where the available bandwidth is commonly insufficient to meet user data-rate requirements. FTN is able to compensate for this loss as described above.

Returning to FIG. 2, when the above-mentioned received signal r(t) is sampled using matched filter 280 to optimize the Signal to Noise Ratio (SNR) and get a sufficient set of data points for the estimation, this results in:

$$y[n]=\int_{-\infty}^{\infty} r(t)\cdot\sqrt{\rho} g_T(t-n\rho T)dt.$$

Given the samples y(n), it is tried to estimate the input data a(n) with as low probability of error as possible. It turns out that the samples y(n) relate to the data and the noise as $$y=Ga+G^{1/2}w$$

where w is IID Gaussian noise and G is a matrix whose elements are given by $$G_{m,n}=\int_{-\infty}^{\infty}\sqrt{\rho}g_T(t-n\rho T)\cdot\sqrt{\rho}g_T(t-m\rho T)dt.$$

In this way, the input data a(n) can be determined.

Figure 4B:
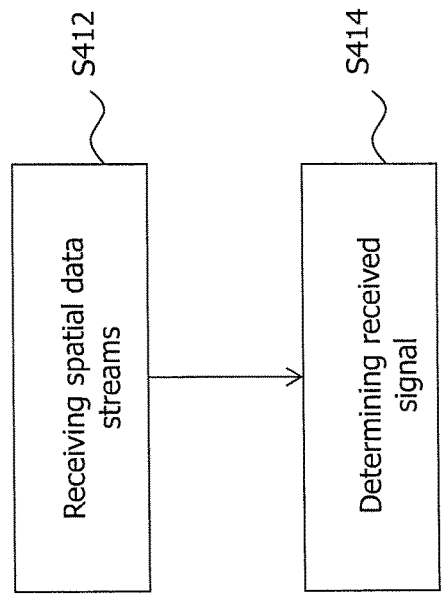
FIG. 4b is a flowchart illustrating a method embodiment performed in the device embodiment of FIG. 1b.
Figure 4A:
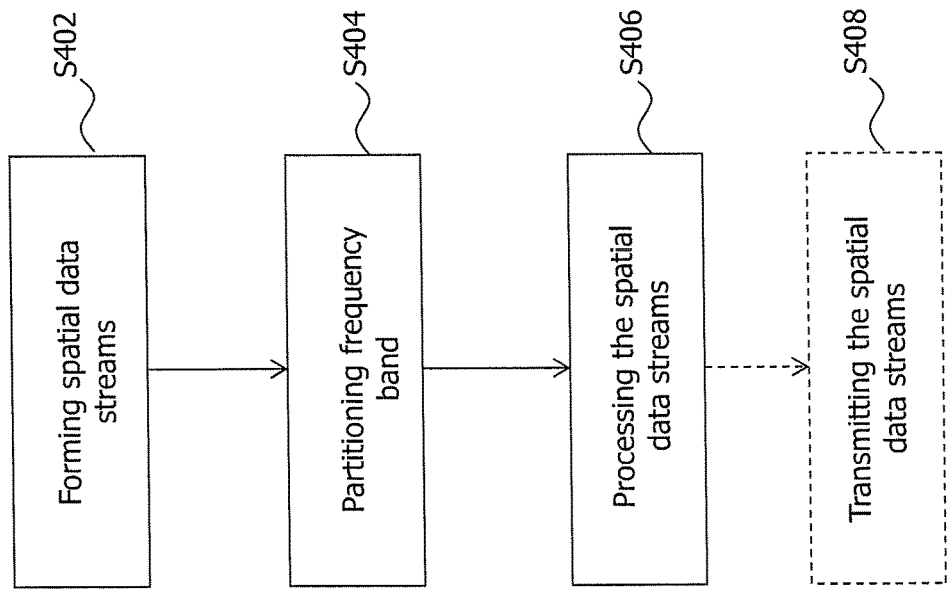

FIG. 4a shows a method embodiment which can be implemented in the apparatus 100 of FIG. 1a. In step S402, the forming component 120 forms two or more spatial data streams from data to be transmitted in the MIMO environment. In step S404, the partitioning component 140 partitions a frequency band available for transmission of the data in the MIMO environment over the two or more spatial data streams into two or more sub-bands. In step S406, the processing component 160 processes each of the two or more spatial data streams using FTN sampling.

The two or more spatial data streams are respectively carried on a respective one of two or more spatial signal streams. The two or more spatial signal streams are respectively transmitted via a spatial stream, i.e. a respective link, between one of multiple transmit antennas and one of multiple receive antennas. For partitioning the frequency band over the two or more spatial data streams into two or more sub-bands, the frequency band is divided into sub-bands and the formed spatial data streams are partitioned or distributed over the sub-bands. Further, the formed spatial data streams are partitioned or distributed to the spatial streams (i.e., the links). The spatial signal streams distributed over the sub-bands are then transmitted over the different spatial streams. In an additional optional step S408, the transmitting component 170 may transmit each of the two or more spatial data streams.

FIG. 4b shows a method embodiment which can be implemented in the apparatus 200 of FIG. 1b. In step S412, the receiving component 220 receives two or more spatial data streams that are processed using FTN sampling. The spatial data streams are formed from data to be transmitted in the MIMO environment as described above with respect to FIG. 4a. A frequency band available for transmission of the data in the MIMO environment is partitioned over the two or more spatial data streams in two or more sub-bands as described above with respect to FIG. 4a. In step S414, the determining component 240 determines a received signal from the two or more received spatial data streams. Although not shown in FIG. 4a, the apparatus 200 or a receiver in which the apparatus 200 is implemented may then estimate the original input data a(n) from the received signal r(t), more particularly, the samples y(n) of the received signal r(t), e.g. by using the equation $$y=Ga+G^{1/2}w$$

Where, as mentioned above, w is IID Gaussian noise, G is a matrix as given above and y(n) are the samples of the received signal r(t) as explained above.

Figure 5:
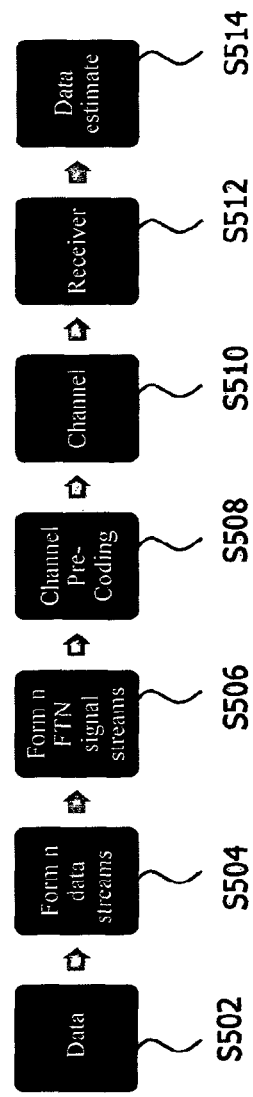
FIG. 5 is a flowchart illustrating a method embodiment performed in the device embodiments of FIGS. 1a and 1b.

In FIG. 5, a flow diagram of a FTN Pre-Coding Procedure for MIMO transmission and reception is schematically shown. In step S502, data is provided that is to be transmitted over the MIMO channel. In step S504, spatial data streams are formed from the data to be transmitted. For sake of explanation rather than limitation it is assumed without limitation that a frequency flat channel having channel matrix H is provided in the MIMO environment for data transmission, wherein the frequency flat channel has n inputs and m outputs. In accordance with this example, up to n spatial data streams can be transmitted over the MIMO channel. Further, it is assumed for explanation rather than limitation that the available base-band spectrum in the MIMO environment is B=[0,W]. In the following it is assumed without limitation that the number of spatial data streams n should equal the number of sub-bands. In this case, the available spectrum is partitioned in n equal parts, such that each sub-band $B_i$ (or sub-carrier) is given by $$B_i = \left[ \frac{(i-1) \cdot W}{n}, \frac{i \cdot W}{n} \right]$$

For sake of explanation rather than limitation it is assumed that all sub-bands $B_i$ have the same bandwidth. However, at least some of the sub-bands may also have different bandwidths.

Then, in step S506, n spatial signal streams are formed. Each spatial signal stream $s_i$ is modulated using FTN over the sub-band $B_i$, i=1, . . . , n. Each spatial signal stream $s_i$ carries a respective one of the spatial data streams formed in step S504.

In step S508, channel precoding is initiated. Precoding may be considered a generalization of beamforming to support multi-stream (or multi-layer) transmission in MIMO wireless communications. In conventional single-stream beamforming, the same signal is emitted from each of the transmit antennas with appropriate weighting (phase and gain) such that the signal power is maximized at the receiver output. When the receiver has multiple antennas, single-stream beamforming cannot simultaneously maximize the signal level at all of the receive antennas. In order to maximize the throughput in multiple receive antenna systems, multi-stream transmission is generally required. In point-to-point (PTP) systems, precoding essentially means that multiple data streams are emitted from the transmit antennas with independent and appropriate weightings such that the link throughput is maximized at the receiver output. In multi-user, the data streams are intended for different users (known as Space-Division Multiple Access (SDMA)). For the precoding, the SVD of the channel is found by means of $$H = U \Sigma V^*$$

where U is an m×m real or complex unitary matrix, Σ is an m×n rectangular diagonal matrix containing singular values of the channel matrix as non-negative real numbers on the diagonal, and V* is an n×n real or complex unitary matrix. In order to determine the channel matrix H, channel state information (CSI) may be used. In wireless communications, CSI refers to known channel properties of a communication link. This information describes how a signal propagates from the transmitter to the receiver and represents the combined effect of, for example, scattering, fading, and power decay with distance.

The CSI makes it possible to adapt transmissions to current channel conditions. This may be crucial for achieving reliable communication with high data rates in multi-antenna systems. CSI is usually estimated at the receiver and usually quantized and fed back to the transmitter (although reverse-link estimation is possible in TDD systems).

Then, a diagonal scaling matrix D is identified. D is chosen to allocate different gains to the different spatial signal streams $s_i$. For example, the choice of D is determined from Σ(Sigma). Σ itself is derivable from H, for example.

However, this is just an example and D can be determined based on other parameters or conditions. D may be determined at the receiver and transmitted to the transmitter, or the other way around.

In step S510, the pre-coded signal $$\bar{s} = V \cdot D \cdot s, s = (s_1, s_2, \ldots, s_n).$$

is transmitted over the channel with $s_i$ being the spatial signal streams mentioned above.

In step S512, a signal r(t) is received by the receiver. Samples y(n) of the received signal r(t) can be determined by means of the following equation as explained above $$y = H\bar{s} + v.$$

The original input data a(n) is finally estimated in step S514 as explained above using:

$$y = Ga + G^{1/2} w$$

One of the advantages of the above procedure is that distributing the available frequency band over the different streams enables preservation of the spectrum using channel pre-coding. It may be desirable that the above procedure is known at the receiver so that the receiver is enabled to decode the data. The above procedure allows coding and decoding over MIMO channels without additional spectral leakage or interference. This increases the capacity of a standard MIMO communication system by transmitting signals at higher rates than the one dictated by the Nyquist rate. In short, a modulation scheme is provided based on transmitting FTN signal streams over different sub-bands of the allowed spectral band. In other words, a spectrum partitioning scheme for transmission of FTN signals over MIMO channels is provided in order to counter the interference between the different streams and at them same time utilize the possibility of spatial diversity. So, as already mentioned in slightly different words, one of the advantages of the proposed procedure is that partitioning the spectrum over the different streams enables preservation of the spectrum using channel pre-coding. This in turn allows for the use of FTN in MIMO systems. This increases the reliability using the spatial diversity, and allows utilizing the spectrum leakage to increase the capacity.

Figure 6:
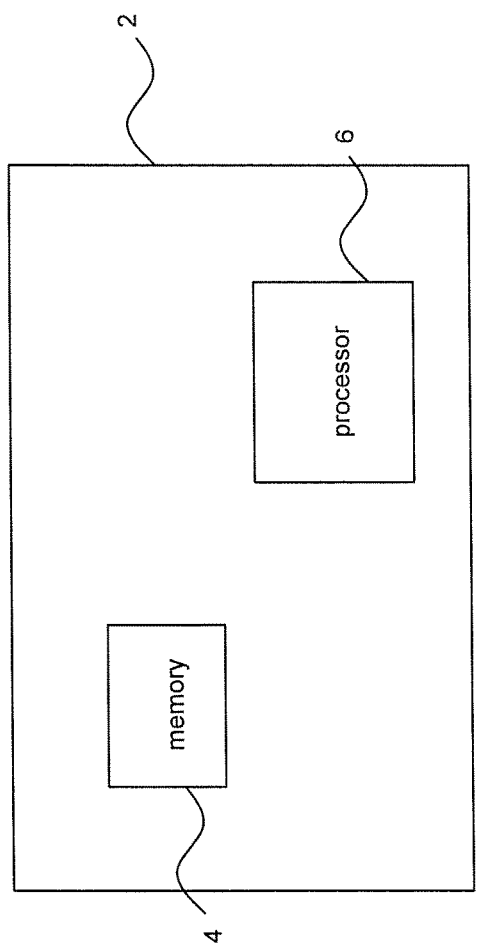

The details explained above may be summarized with respect to FIG. 6. FIG. 6 is a block diagram schematically illustrating a device embodiment of a node 2 for supporting Faster-Than-Nyquist (FTN) transmission of data in a Multiple Input Multiple Output (MIMO) environment.

By way of example, the node 2 is described to implement the functionalities of the apparatus 100 according to the embodiment of FIG. 1a. Alternatively or additionally, the node 2 may implement the functionalities of the apparatus 200 according to the embodiment of FIG. 1b. The node 2 comprises a memory or memory arrangement 4 and a processor or processor arrangement 6. The memory or memory arrangement 4 contains control instructions or program code portions executable by the processor or processor arrangement 6. The processor or processor arrangement 6 is configured to form two or more spatial data streams from data to be transmitted in the MIMO environment and/or execute the control instruction in the memory or memory arrangement 4 in order to control such a forming. The processor or processor arrangement 6 is configured to partition a frequency band available for transmission of the data in the MIMO environment over the two or more spatial data streams into two or more sub-bands and/or to control such partitioning. The processor or processor arrangement 6 is configured to process each of the two or more spatial data streams using FTN sampling and/or to control such processing. A processor arrangement 6 may generally comprise one or more than one processors and/or processor cores. A processor or processor core may comprise integrated control or processing circuitry. A memory arrangement may comprise one or more than one memories, which may be of same or different types. A memory may comprise RAM (Random Access Memory), ROM (Read-Only Memory), EPROM, cache memory, optical memory, etc.

Figure 7:
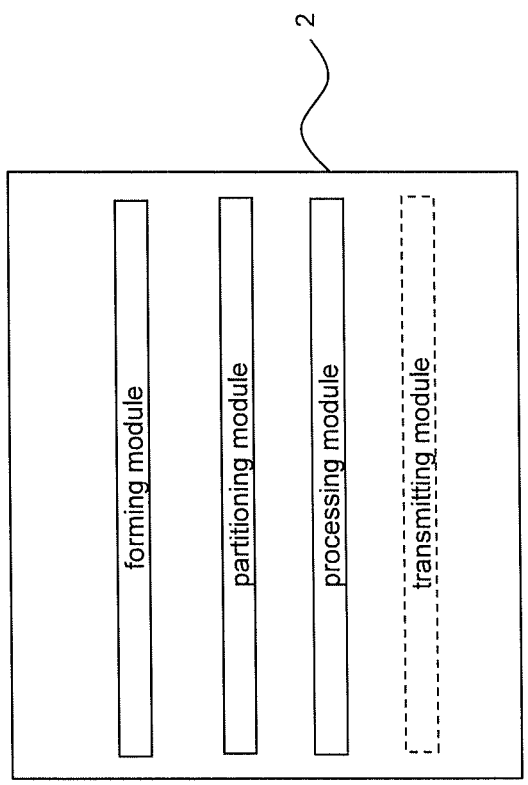

FIG. 7 shows a functional block diagram of a device or node 2 configured in accordance with the principles of the disclosure as described above. In particular, device or node 2 may be seen as representing an apparatus for supporting Faster-Than-Nyquist (FTN) transmission of data in a Multiple Input Multiple Output (MIMO) environment as disclosed herein. The functional blocks of the device 2 may be implemented by hardware, software, or a combination of hardware and software to carry out the principles of the disclosure. It is understood by a person skilled in the art that the functional blocks described in FIG. 7 may be combined or separated into sub-blocks to implement the principles of the disclosure as described above. Therefore, the description herein may support any possible combination or separation or further definition of the functional blocks described herein. The device 2 of FIG. 7 is for supporting FTN transmission of data in a MIMO environment. The device 2 comprises a forming module for forming two or more spatial data streams from data to be transmitted in the MIMO environment. The device 2 further comprises a partitioning module for partitioning a frequency band available for transmission of the data in the MIMO environment over the two or more spatial data streams into two or more sub-bands. The device 2 further comprises a processing module for processing each of the two or more spatial data streams using FTN sampling. The device 2 may further comprise a transmitting module for transmitting each of the two or more spatial data streams.

FIG. 8 shows a functional block diagram of a device or node 4 configured in accordance with the principles of the disclosure as described above. In particular, device or node 4 may be seen as representing an apparatus for supporting reception of data transmitted Faster-Than-Nyquist (FTN) in a Multiple Input Multiple Output (MIMO) environment as disclosed herein. The functional blocks of the device 4 may be implemented by hardware, software, or a combination of hardware and software to carry out the principles of the disclosure. It is understood by a person skilled in the art that the functional blocks described in FIG. 8 may be combined or separated into sub-blocks to implement the principles of the disclosure as described above. Therefore, the description herein may support any possible combination or separation or further definition of the functional blocks described herein. The device 4 of FIG. 8 is for supporting reception of data transmitted FTN in a MIMO environment. The device 4 comprises a receiving module for receiving two or more spatial data streams that are processed using FTN sampling, wherein the spatial data streams are formed from data to be transmitted in the MIMO environment and wherein a frequency band available for transmission of the data in the MIMO environment is partitioned over the two or more spatial data streams in two or more sub-bands. The device 4 further comprises a determining module for determining a received signal from the two or more received spatial data streams.

Many advantages of the present disclosure will be fully understood from the foregoing description, and it will be apparent that various changes may be made in the form, construction and arrangement of the units and devices without departing from the scope of the present disclosure and/or without sacrificing all of its advantages. Since the present disclosure can be varied in many ways, it will be recognized that the present disclosure should be limited only by the scope of the following claims.

The invention claimed is:

1. A method of supporting Faster-Than-Nyquist (FTN) transmission of data in a Multiple Input Multiple Output (MIMO) environment, the method comprising:
    forming two or more spatial data streams from the data to be transmitted in the MIMO environment;
    partitioning a frequency band, available for the transmission of the data in the MIMO environment over the two or more spatial data streams, into two or more sub-bands, wherein a number of the two or more spatial data streams is equal to a number of the two or more partitioned sub-bands;
    allocating one of the two or more partitioned sub-bands to each of the two or more spatial data streams;
    processing each of the two or more spatial data streams using FTN sampling; and
    transmitting each of the two or more spatial data streams over the two or more partitioned sub-bands, wherein transmitting over the two or more partitioned sub-bands results in reduction of interference between the two or more spatial data streams, thereby utilizing spectrum leakage to increase capacity of a communication system in the MIMO environment.

2. The method of claim 1, wherein the two or more partitioned sub-bands have an equal bandwidth, respectively.

3. The method of claim 1, wherein the method further comprises precoding the two or more spatial data streams based on information about properties of a MIMO channel of the MIMO environment.

4. A non-transitory computer-readable recording medium comprising a computer program, wherein the computer program comprises program code portions for causing the method of claim 1 to be performed when the computer program is run on a computer system.

5. A method of supporting reception of data transmitted Faster-Than-Nyquist (FTN) in a Multiple Input Multiple Output (MIMO) environment, the method comprising:
    receiving two or more spatial data streams that are processed using FTN sampling, wherein the two or more spatial data streams are formed from the data to be transmitted in the MIMO environment, wherein a frequency band available for the transmission of the data in the MIMO environment is partitioned over the two or more spatial data streams into two or more sub-bands, wherein a number of the two or more spatial data streams is equal to a number of the two or more partitioned sub-bands, wherein one of the two or more partitioned sub-bands is allocated to each of the two or more spatial data streams, and wherein the transmission of the two or more spatial data streams over the two or more partitioned sub-bands results in reduction of interference between the two or more spatial data streams, thereby utilizing spectrum leakage to increase capacity of a communication system in the MIMO environment;
    determining a received signal from the two or more received spatial data streams; and
    determining the transmitted data from the received signal.

6. The method of claim 5, wherein the transmitted data is determined by using the following equation $y = Ga + G^{1/2}w$, where G is a matrix determined from FTN pulses for sampling the transmitted data, a is the transmitted data, and w is Gaussian noise.

7. A method of Faster-Than-Nyquist (FTN) transmission of data in a Multiple Input Multiple Output (MIMO) environment, the method comprising:
forming two or more spatial data streams from the data to be transmitted in the MIMO environment;
partitioning a frequency band, available for the transmission of the data in the MIMO environment over the two or more spatial data streams, into two or more sub-bands, wherein a number of the two or more spatial data streams is equal to a number of the two or more partitioned sub-bands;
allocating one of the two or more partitioned sub-bands to each of the two or more spatial data streams;
processing each of the two or more spatial data streams using FTN sampling;
transmitting each of the two or more spatial data streams over the two or more partitioned sub-bands, wherein transmitting over the two or more partitioned sub-bands results in reduction of interference between the two or more spatial data streams, thereby utilizing spectrum leakage to increase capacity of a communication system in the MIMO environment;
receiving the two or more spatial data streams;
determining a received signal from the two or more received spatial data streams; and
determining the transmitted data from the received signal.

8. An apparatus for supporting Faster-Than-Nyquist (FTN) transmission of data in a Multiple Input Multiple Output (MIMO) environment, the apparatus comprising one or more processors configured to:
form two or more spatial data streams from the data to be transmitted in the MIMO environment;
partition a frequency band, available for the transmission of the data in the MIMO environment over the two or more spatial data streams, into two or more sub-bands, wherein a number of the two or more spatial data streams is equal to a number of the two or more partitioned sub-bands;
allocate one of the two or more partitioned sub-bands to each of the two or more spatial data streams;
process each of the two or more spatial data streams using FTN sampling; and
transmit each of the two or more spatial data streams over the two or more partitioned sub-bands, wherein the transmission over the two or more partitioned sub-bands results in reduction of interference between the two or more spatial data streams, thereby utilizing spectrum leakage to increase capacity of a communication system in the MIMO environment.

9. An apparatus for supporting reception of data transmitted Faster-Than-Nyquist (FTN) in a Multiple Input Multiple Output (MIMO) environment, the apparatus comprising one or more processors configured to:
receive two or more spatial data streams that are processed using FTN sampling, wherein the two or more spatial data streams are formed from the data to be transmitted in the MIMO environment, wherein a frequency band available for the transmission of the data in the MIMO environment is partitioned over the two or more spatial data streams into two or more sub-bands, wherein a number of the two or more spatial data streams is equal to a number of the two or more partitioned sub-bands, wherein one of the two or more partitioned sub-bands is allocated to each of the two or more spatial data streams, and wherein the transmission of the two or more spatial data streams over the two or more partitioned sub-bands results in reduction of interference between the two or more spatial data streams, thereby utilizing spectrum leakage to increase capacity of a communication system in the MIMO environment;
determine a received signal from the two or more received spatial data streams; and
determine the transmitted data from the received signal.

* * * * *